US012571222B2

(12) United States Patent　　　　(10) Patent No.:　US 12,571,222 B2
Moreno et al.　　　　　　　　　　　(45) Date of Patent:　　Mar. 10, 2026

(54) ADDITIVE MANUFACTURING CONSTRUCTION WITH CEMENT-BASED MATERIALS USING MECHANICALLY INTERLOCKED LAYERS

(71) Applicant: Icon Technology, Inc., Austin, TX (US)

(72) Inventors: Daniel Galvez Moreno, Austin, TX (US); Aida Margarita Ley Hernandez, Austin, TX (US); Kunal Kupwade-Patil, Austin, TX (US); Alexander Le Roux, Austin, TX (US)

(73) Assignee: ICON Technology, Inc., Austin, TX (US)

( * ) Notice: Subject to any disclaimer, the term of this patent is extended or adjusted under 35 U.S.C. 154(b) by 0 days.

(21) Appl. No.: 17/701,897

(22) Filed: Mar. 23, 2022

(65) Prior Publication Data

US 2022/0307277 A1　　Sep. 29, 2022

Related U.S. Application Data

(60) Provisional application No. 63/165,285, filed on Mar. 24, 2021.

(51) Int. Cl.
| | |
|---|---|
| *E04G 21/04* | (2006.01) |
| *B33Y 10/00* | (2015.01) |
| *B33Y 30/00* | (2015.01) |
| *E04B 1/16* | (2006.01) |
| *B28B 1/00* | (2006.01) |

(Continued)

(52) U.S. Cl.
CPC .............. *E04G 21/04* (2013.01); *B33Y 10/00* (2014.12); *B33Y 30/00* (2014.12); *E04B 1/16*

(2013.01); *B28B 1/001* (2013.01); *B29C 64/118* (2017.08); *B29C 64/209* (2017.08)

(58) Field of Classification Search
CPC ..... B29C 64/118; B29C 64/209; B29C 48/03; B28B 1/001
See application file for complete search history.

(56) References Cited

U.S. PATENT DOCUMENTS

| | | | |
|---|---|---|---|
| 2004/0164436 A1* | 8/2004 | Khoshnevis | ........ E04G 21/0463 425/463 |
| 2017/0312985 A1* | 11/2017 | Talgorn | ................. B29C 64/118 |

(Continued)

FOREIGN PATENT DOCUMENTS

| | | |
|---|---|---|
| DE | 102018130273 | 6/2020 |
| EP | 3486069 A1 * | 5/2019 |
| WO | WO-2022006560 A1 * | 1/2022 |

OTHER PUBLICATIONS

International Search Report and Written Opinion issued to related PCT Application No. PCT/US2022/021488, dated Aug. 11, 2022, 11 pages.

*Primary Examiner* — Andrew L Swanson
(74) *Attorney, Agent, or Firm* — KOKKA & BACKUS, PC

(57)　　　　　　ABSTRACT

An extruder nozzle includes a proximal end and a distal end. The proximal end includes a proximal cross-section. The distal end includes a distal cross-section. The proximal cross-section is different from the distal cross-section. 3D printable material is configured to flow through the extruder nozzle from the proximal end to the distal end, such that the extruder nozzle deposits a layer of 3D printable material on top of a prior layer of 3D printable material.

10 Claims, 5 Drawing Sheets

(51) Int. Cl.
    *B29C 64/118*         (2017.01)
    *B29C 64/209*         (2017.01)

(56)             References Cited

U.S. PATENT DOCUMENTS

| | | | |
|---|---|---|---|
| 2018/0071949 A1* | 3/2018 | Giles | B28B 1/001 |
| 2018/0345376 A1 | 12/2018 | Page | |
| 2021/0114303 A1* | 4/2021 | Cook | B28B 23/0062 |
| 2022/0176586 A1* | 6/2022 | Mechtcherine | B28B 23/0006 |
| 2023/0256649 A1* | 8/2023 | Mcgee | B33Y 30/00 |
| | | | 425/149 |

* cited by examiner

202

200

ADDITIVE MANUFACTURING CONSTRUCTION WITH CEMENT-BASED MATERIALS USING MECHANICALLY INTERLOCKED LAYERS

PRIORITY CLAIM AND CROSS-REFERENCE TO RELATED APPLICATIONS

The present application claims priority to and the benefit of U.S. Provisional Patent App. No. 63/165,285, filed on Mar. 24, 2021, titled ADDITIVE MANUFACTURING CONSTRUCTION WITH CEMENT-BASED MATERIALS USING MECHANICALLY INTERLOCKED LAYERS, the entire contents of which are incorporated by reference herein and relied upon.

BACKGROUND

Portland Cement, and other forms of binders, have historically played an integral role in the construction of any large scale concrete buildings. In a typical use case, concrete is initially mixed off-site (e.g., away from the construction project) and then transported via truck or other means to the construction site. Once at the site, the truck delivers, or pours, concrete at a desired location. Alternatively, concrete may be mixed on-site and pumped up to a desired floor for delivery. From there, skilled laborers smooth and shape the concrete, and allow it to set or harden.

Three dimensional (3D) printing of cement-based materials using specialized equipment is an interesting and challenging new application employing the use of concrete and mortar. In such 3D printing, specialized equipment is used to deposit a concrete or mortar layer at a specific location using a degree of precision, oftentimes on top of a previously deposited layer. One problem with 3D printing of cement-based materials is the mechanical rigidity of the fabricated item, once printed.

Specifically, additive manufacturing construction with cement-based materials requires sufficient interlayer bond strength (i.e., between printed layers of material) to ensure structural integrity. Interlayer bond strength may be affected by environmental factors, such as ambient temperature and/or relative humidity, and technical factors inherent to the additive manufacturing construction process such as lift-time variability and/or the use of set retardants or accelerators. Furthermore, additive manufacturing construction techniques with cement-based materials are prone to anisotropy; specifically, the mechanical properties of the fabricated elements are sensitive to certain directions of mechanical loading, such as lateral loads.

Accordingly, for at least these reasons, a need exists for a printable material that is extrudable and deposited in interlocking layers.

SUMMARY

To meet the needs noted above and others, the present disclosure provides a 3D printing system with printable cement-based material that implements mechanically interlocked layers. Namely, by extruding cementitious material and subsequently depositing the cementitious material with a specific cross-section, which interlocks with the previous layer's cross-section, the 3D system prints in mechanically interlocked layers. These mechanically interlocked layers provide larger contact areas between the layers themselves, via increased surface area. Mechanically interlocked layers further include surface features, such as ridges, which improve lateral load capabilities of the printed layers and subsequent wall.

More specifically, the proposed extrusion nozzles, 3D printing systems, and related techniques for printing mechanically interlocked layers disclosed herein improve the shear bond strength while simultaneously reducing anisotropy. Furthermore, the mechanically interlocked layers provide for increased surface area between subsequent layers without changing the width of the layers themselves or requiring additional material. To preserve the shape of the extruded cross-section, the rheology of the cementitious material must be carefully controlled, to provide sufficient rigidity without sacrificing the ability of pumping and shaping the layer in the extruder nozzle. The cementitious material should ideally transition from low to high apparent viscosity as applied shear rate changes from high-to-low. Additionally, the flocculation rate of the mix must be high, in order to provide load bearing capabilities within short periods of time.

In light of the disclosure herein, and without limiting the scope of the invention in any way, in a first aspect of the present disclosure, which may be combined with any other aspect listed herein unless specified otherwise, an extruder nozzle includes a proximal end and a distal end. The proximal end includes a proximal cross-section. The distal end includes a distal cross-section. The proximal cross-section is different from the distal cross-section. 3D printable material is configured to flow through the extruder nozzle from the proximal end to the distal end, such that the extruder nozzle deposits a layer of 3D printable material on top of a prior layer of 3D printable material.

In a second aspect of the present disclosure, which may be combined with any other aspect listed herein unless specified otherwise, the proximal cross-section defines a first plane and the distal cross-section defines a second plane. The first plane is generally perpendicular to the second plane.

In a third aspect of the present disclosure, which may be combined with any other aspect listed herein unless specified otherwise, the proximal cross-section defines a first plane and the distal cross-section defines a second plane. The first plane is disposed at an angle relative to the second plane.

In a fourth aspect of the present disclosure, which may be combined with any other aspect listed herein unless specified otherwise, the extruder nozzle is configured to rotate about an axis orthogonal to the first plane.

In a fifth aspect of the present disclosure, which may be combined with any other aspect listed herein unless specified otherwise, the proximal cross-section is generally circular.

In a sixth aspect of the present disclosure, which may be combined with any other aspect listed herein unless specified otherwise, the distal cross-section is generally rectangular.

In a seventh aspect of the present disclosure, which may be combined with any other aspect listed herein unless specified otherwise, the distal cross-section includes a plurality of ridges on a top-side and a bottom-side of the distal cross-section.

In an eighth aspect of the present disclosure, which may be combined with any other aspect listed herein unless specified otherwise, the distal cross-section includes two ridges on a top-side of the distal cross-section and includes two ridges on a bottom-side of the distal cross-section.

In a ninth aspect of the present disclosure, which may be combined with any other aspect listed herein unless specified otherwise, the layer of 3D printable material, once deposited, has a generally M-shaped cross-section.

In a tenth aspect of the present disclosure, which may be combined with any other aspect listed herein unless specified otherwise, the M-shaped cross-section mates with a cross-section of the prior layer of 3D printable material.

In an eleventh aspect of the present disclosure, which may be combined with any other aspect listed herein unless specified otherwise, the distal cross-section is between 30 and 60 mm in width.

In a twelfth aspect of the present disclosure, which may be combined with any other aspect listed herein unless specified otherwise, the distal cross-section is between 15 and 25 mm in height.

In a thirteenth aspect of the present disclosure, which may be combined with any other aspect listed herein unless specified otherwise, a method of 3D printing includes mixing 3D printable material and pumping the 3D printable material through an extruder nozzle. The method further includes printing a first layer having a top surface and a bottom surface, and printing a second layer having a top surface and a bottom surface. The bottom surface of the second layer contacts the top surface of the first layer. Each of the top surface of the first layer and the bottom surface of the second layer includes a plurality of ridges, such that the first layer and the second layer are interlocked with one another.

In a fourteenth aspect of the present disclosure, which may be combined with any other aspect listed herein unless specified otherwise, the extruder nozzle includes a proximal end and a distal end. The proximal end includes a proximal cross-section, and the distal end includes a distal cross-section.

In a fifteenth aspect of the present disclosure, which may be combined with any other aspect listed herein unless specified otherwise, the proximal cross-section defines a first plane, the distal cross-section defines a second plane, and the first plane is disposed at an angle, relative to the second plane.

In a sixteenth aspect of the present disclosure, which may be combined with any other aspect listed herein unless specified otherwise, the extruder nozzle is configured to rotate about an axis orthogonal to the first plane.

In a seventeenth aspect of the present disclosure, which may be combined with any other aspect listed herein unless specified otherwise, the proximal cross-section is generally circular, and wherein the distal cross-section is generally rectangular.

In an eighteenth aspect of the present disclosure, which may be combined with any other aspect listed herein unless specified otherwise, the distal cross-section includes a plurality of ridges on a top-side and a bottom-side of the distal cross-section.

In a nineteenth aspect of the present disclosure, which may be combined with any other aspect listed herein unless specified otherwise, the distal cross-section includes two ridges on the top-side of the distal cross-section and includes two ridges on the bottom-side of the distal cross-section.

In a twentieth aspect of the present disclosure, which may be combined with any other aspect listed herein unless specified otherwise, the second layer, once deposited, has a generally M-shaped cross-section.

Additional features and advantages of the disclosed devices, systems, and methods are described in, and will be apparent from, the following Detailed Description and the Figures. The features and advantages described herein are not all-inclusive and, in particular, many additional features and advantages will be apparent to one of ordinary skill in the art in view of the figures and description. Also, any particular embodiment does not have to have all of the advantages listed herein. Moreover, it should be noted that the language used in the specification has been selected for readability and instructional purposes, and not to limit the scope of the inventive subject matter.

BRIEF DESCRIPTION OF THE FIGURES

Understanding that figures depict only typical embodiments of the invention and are not to be considered to be limiting the scope of the present disclosure, the present disclosure is described and explained with additional specificity and detail through the use of the accompanying figures. The figures are listed below.

DETAILED DESCRIPTION

Certain embodiments described herein relate generally to the field of 3D printing systems for printing cementitious material in layers.

Conventional 3D printing systems may implement a pumping system, whereby a cementitious mixture is required to pass through an extended line of pipe, over substantial lengths and through various gate types, bends, nozzles, and the like. The cementitious mixture needs to be sufficiently fluid, having a particular viscosity to allow for movement through the system. The mixture is then extruded from the nozzle as an elongated bead, layer by layer vertically upward to form a wall. The printable cementitious material described herein has particular fluid parameters, such as a certain viscosity and setting time that allow for 3D printing. These fluid parameters further allow for a subsequent layer to be printed on top of a previous layer.

Figure 1:
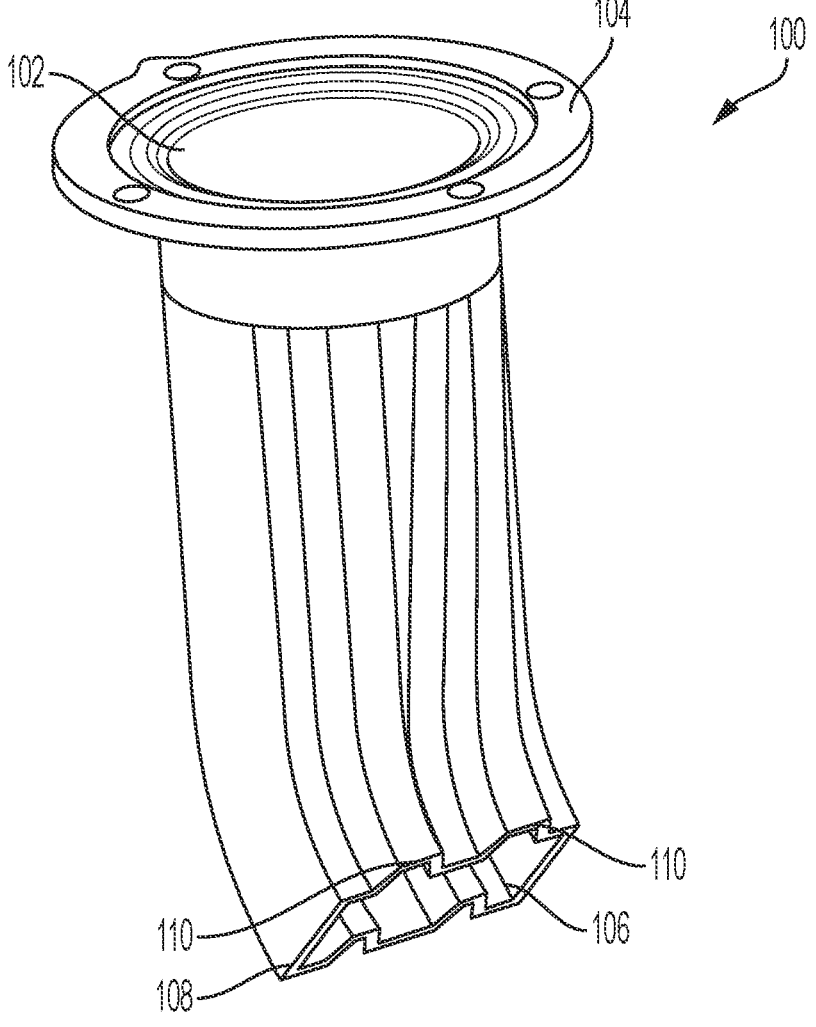
FIG. 1 illustrates an extruder nozzle prototype, according to an example embodiment of the present disclosure.
Figure 2:
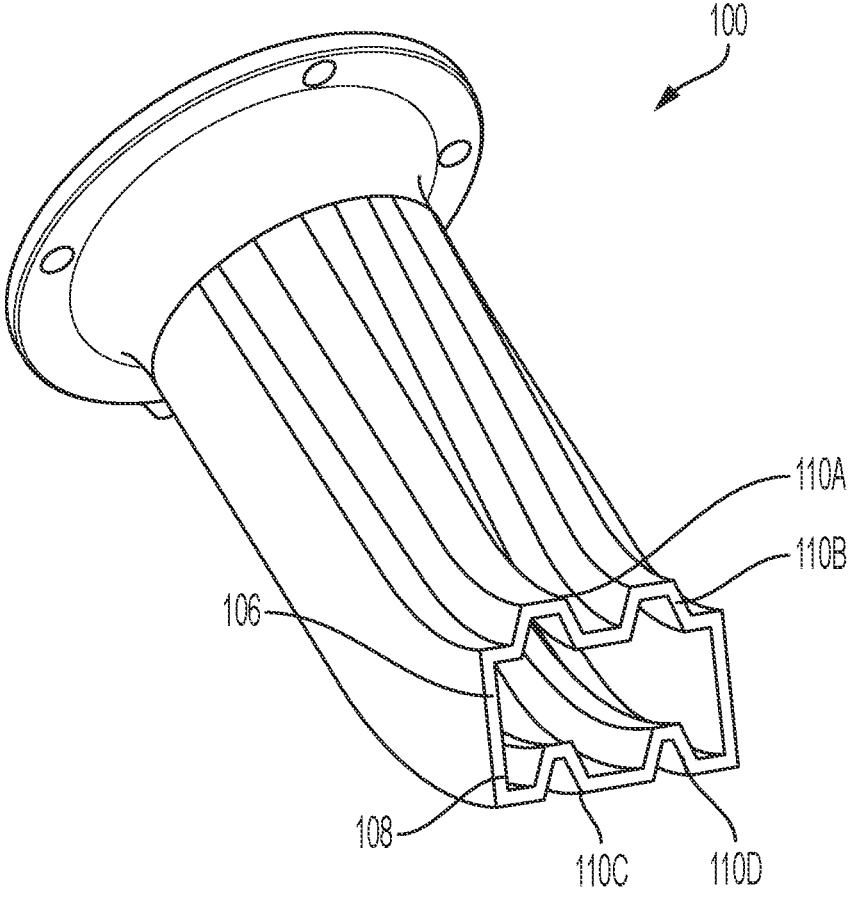
FIG. 2 illustrates a detailed view of surface ridges on the extruder nozzle prototype in FIG. 1, according to an example embodiment of the present disclosure.

For example, referring now to the Figures, FIGS. 1 and 2 illustrate a first extruder nozzle 100.

First extruder nozzle 100 is configured to gradually shape material as it is advanced to the exit of the extruder nozzle 100. First extruder nozzle 100 includes a proximal end 102 having a proximal cross-section 104. First extruder nozzle 100 further includes a distal end 106 having a distal cross-section 108. In an example embodiment, the distal cross-section 108 is between 30 and 60 mm in width. In an example embodiment, the distal cross-section 108 is between 15 and 25 mm in height.

Proximal cross-section 104 defines a first plane and distal cross-section 108 defines a second plane. In an example embodiment, the first plane is angled relative to the second plane (e.g., approximately 30 to 60 degrees). Namely, by having an angled second plane, at the distal end 106 of extruder nozzle 100, a layer advantageously puts "downward" pressure onto a prior layer, as the layer is extruded from extruder nozzle 100. This improves compression between layers during depositing (as discussed in greater detail herein).

In a different example embodiment, the first plane is generally perpendicular to the second plane. For example, first extruder nozzle 100 is configured to have approximately a 90-degree bend, from proximal end 102 to distal end 106. It should be appreciated that other angular bends (e.g., more or less than 90-degrees) are likewise contemplated herein.

Figure 4:
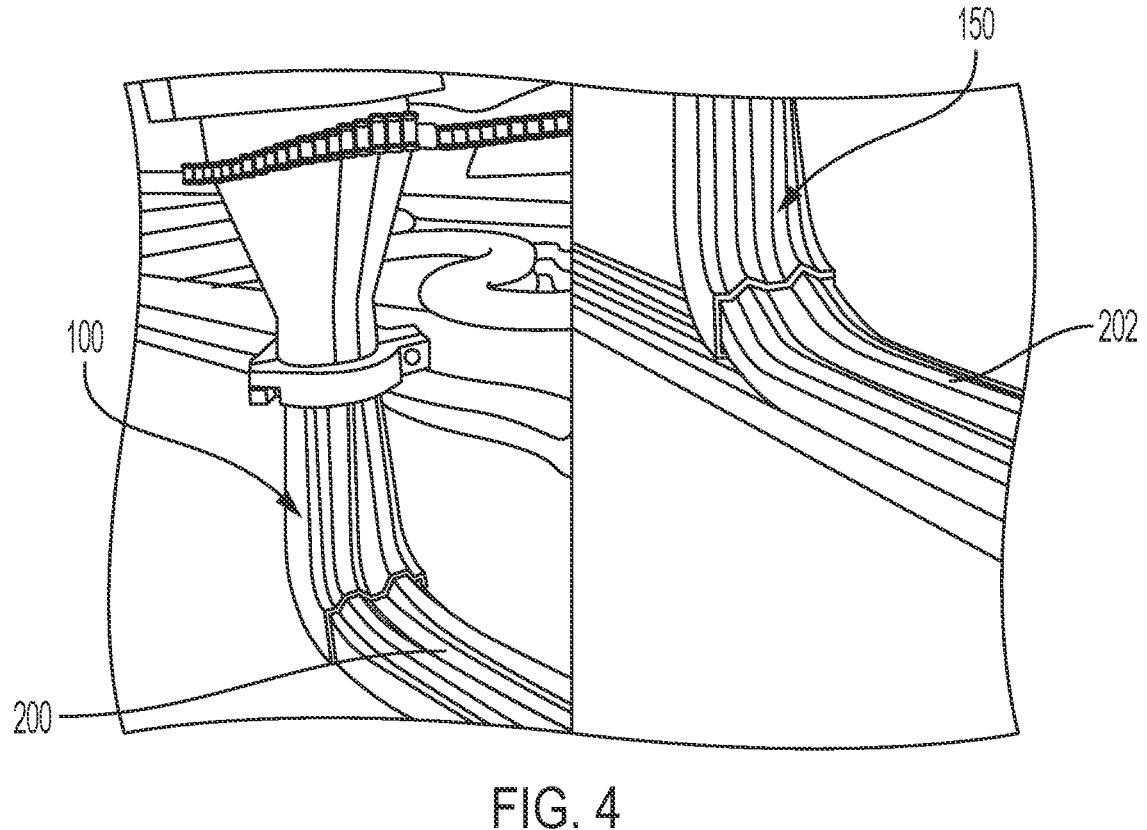
FIG. 4 illustrates extruder nozzle prototypes, printing 3D material in multiple interlocked layers, according to an example embodiment of the present disclosure.

3D printable material, such as cementitious material, is configured to flow through extruder nozzle 100 from the proximal end 102 to the distal end 106. For example, proximal end 102 may be coupled to, and in fluid communication with, piping or other tubing and thus one or more pumps and mixers, which provide provides cementitious material as it is prepared. This cementitious material is delivered, through the system, to proximal end 102 of first extruder nozzle 100. Cementitious material then flows through nozzle 100 to the distal end 106; once delivered to the distal end, the cementitious material is deposited or "printed" as a cementitious layer. Specifically, as illustrated by FIG. 4, nozzle 100 translates in one or more directions as nozzle 100 delivers cementitious material, thus printing a first cementitious layer 200.

Continuing on with FIGS. 1 to 2, in an example embodiment, nozzle 100 is configured to rotate about an axis orthogonal to the first plane defined by the proximal cross-section 104. For example, nozzle 100 is coupled to piping or other tubing, and configured to directionally rotate about the piping or other tubing.

FIG. 1 illustrates that nozzle 100 includes a plurality of surface ridges 110, disposed on a top-side and a bottom-side of the distal end 106 of nozzle 100. These surface ridges are illustrated, with particularity, in FIG. 2. Namely, in an embodiment, nozzle 100 includes two ridges 110A-B on a top side of distal end 106. The two ridges 110A-B extend beyond the generally rectangular cross-section defined by distal cross-section 108. In a specific embodiment, surface ridges 110A-B are three sided ridges (e.g., one-half of a hexagon). Similarly, in an embodiment, nozzle 100 includes two ridges 110C-D on a bottom side of distal end 106. The two ridges 110C-D extend into the generally rectangular cross-section defined by distal cross-section 108. In a specific embodiment, surface ridges 110C-D are V-notch ridges.

Furthermore, surface ridges 110A-D are configured ensure that deposited material interlocks between subsequent layers of deposited material. For example, surface ridge 110A is vertically aligned with surface ridge 110C. Similarly, surface ridge 110B is vertically aligned with surface ridge 110D. Via this alignment, deposited layers may engage or interlock with a prior layer through the cross-sectional geometry of the prior deposited layer. This interlocking is described in greater detail herein.

As illustrated by nozzle 100, for example, surface ridges 110 taper from being fully defined at distal end 106 to being non-defined at proximal end 102; thus, as an example, cementitious material undergoes smooth transition as it flows through nozzle 100, from proximal cross-section 104 to a substantially different distal cross-section 108 including surface ridges 110A-D.

Figure 3:
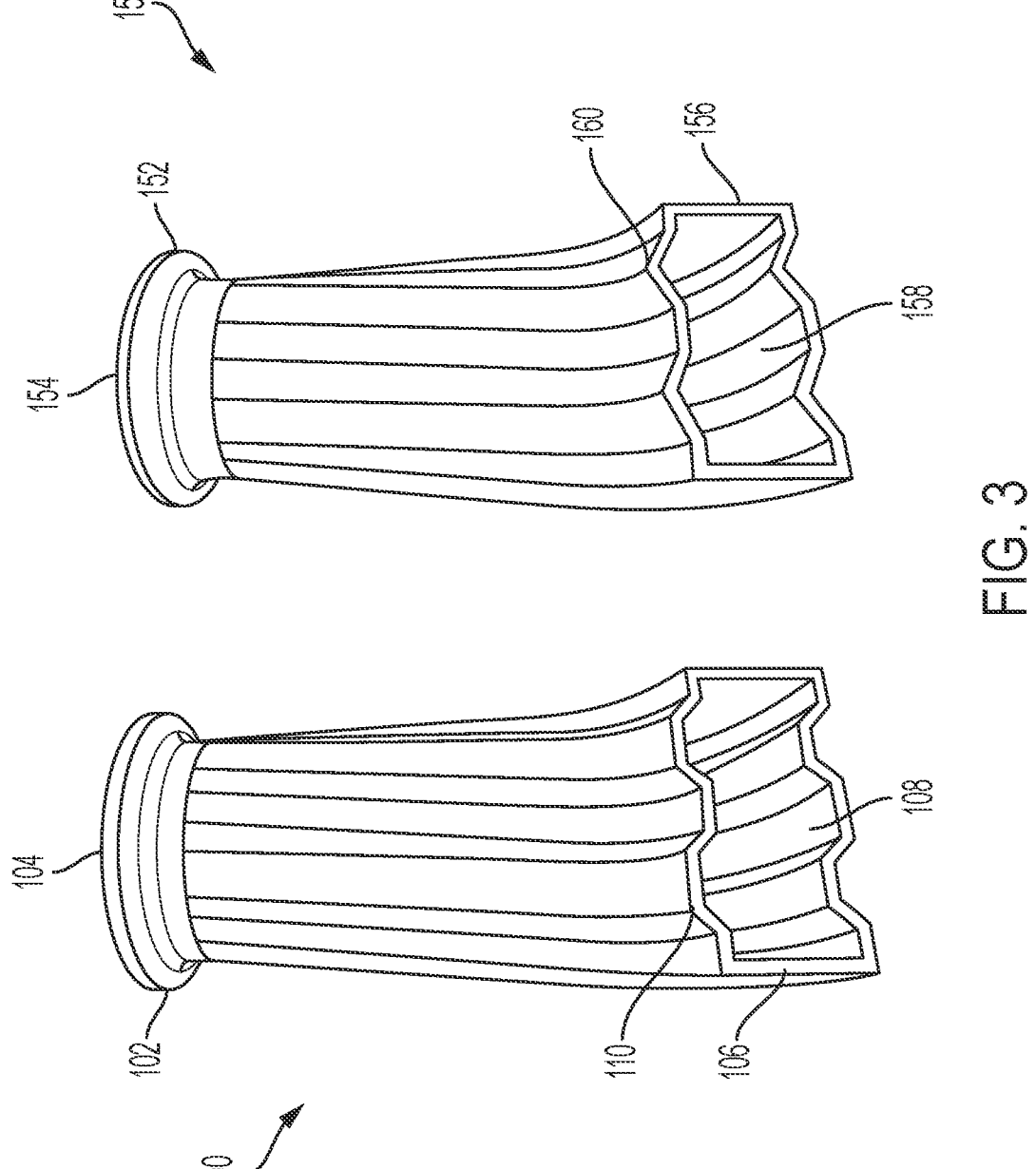
FIG. 3 illustrates various extruder nozzle prototypes, according to example embodiments of the present disclosure.

Generally, it should be appreciated that other geometries for the distal cross-section 108 are contemplated herein. Namely, FIG. 3 illustrates both the first extruder nozzle 100 (described above) and a second extruder nozzle 150. As described in greater detail herein, each of first extruder nozzle 100 and second extruder nozzle 150 include different cross-sectional shapes, configured for subsequent printing of cementitious material in interlocked layers. Each of first extruder nozzle 100 and second extruder nozzle 150 are configured to gradually shape material as it is advanced to the exit of the respective extruder nozzle.

Second extruder nozzle 150 includes a proximal end 152 having a proximal cross-section 154. Second extruder nozzle 150 further includes a distal end 156 having a distal cross-section 158. Similar to extruder nozzle 100, 3D printable material, such as cementitious material, is configured to flow through second extruder nozzle 150 from the proximal end 152 to the distal end 156. Similarly, as illustrated by FIG. 4, nozzle 150 translates in one or more directions as nozzle 150 delivers cementitious material, thus printing a second cementitious layer 202. In an embodiment, nozzle 100 deposits first layer 200 whereas nozzle 150 deposits second layer 202 on top of first layer 200. In a different embodiment, nozzle 100 deposits both first layer 200 and second layer 202. In another different embodiment, nozzle 150 deposits both first layer 200 and second layer 202.

Referring back to FIG. 3, in an example embodiment, each of the nozzles 100, 150 includes different cross-sectional shapes at the proximal and distal ends. For example, nozzle 100 includes a generally circular cross-section at proximal cross-section 104; nozzle 100 includes a generally rectangular cross-section at distal cross-section 108. Similarly, for example, nozzle 150 includes a generally circular cross-section at proximal cross-section 154; nozzle 150 includes a generally rectangular cross-section at distal cross-section 158. In an example embodiment, proximal cross-section 104 is approximately 30 to 70 mm in diameter.

Similar to nozzle 100 above, nozzle 150 may include a distal cross-section 158 that is angled in one or more configurations. For example, proximal cross-section 154 defines a first plane and distal cross-section 158 defines a second plane. In an example embodiment, the first plane is angled relative to the second plane (e.g., approximately 30 to 60 degrees). Namely, by having an angled second plane, at the distal end 156 of extruder nozzle 150, a layer advantageously puts "downward" pressure onto a prior layer, as the layer is extruded from extruder nozzle 150. This improves compression between layers during depositing. In a different example embodiment, the first plane is generally perpendicular to the second plane. For example, first extruder nozzle 150 is configured to have approximately a 90-degree bend, from proximal end 152 to distal end 156. It should be appreciated that other angular bends (e.g., more or less than 90-degrees) are likewise contemplated herein.

Similarly, each of nozzles 100, 150 may include different surface features at the distal ends. As noted prior, in an embodiment, nozzle 100 includes a plurality of surface ridges 110A-B, which are three-sided ridges (e.g., one half of a hexagon) and a plurality of surfaces ridges 110C-D, which are V-notch ridges. Likewise, for example, the plurality of surface ridges 160 at distal end 156 of nozzle 150 may be two-sided ridges (e.g., one half of a square or V-notch) on both the top side and the bottom side of distal end 156 of nozzle 150. It should be appreciated that other types of surface ridges are contemplated herein, such as semi-circles, ellipses, one half of an octagon, and other related geometrical features. Furthermore, it should be appreciated that while each of nozzle 100 and nozzle 150 include two surface ridges on the top-side and bottom-side of the respective distal cross-sections, other numbers of ridges such as one ridge, three ridges, or the like, are contemplated herein.

Figure 5:
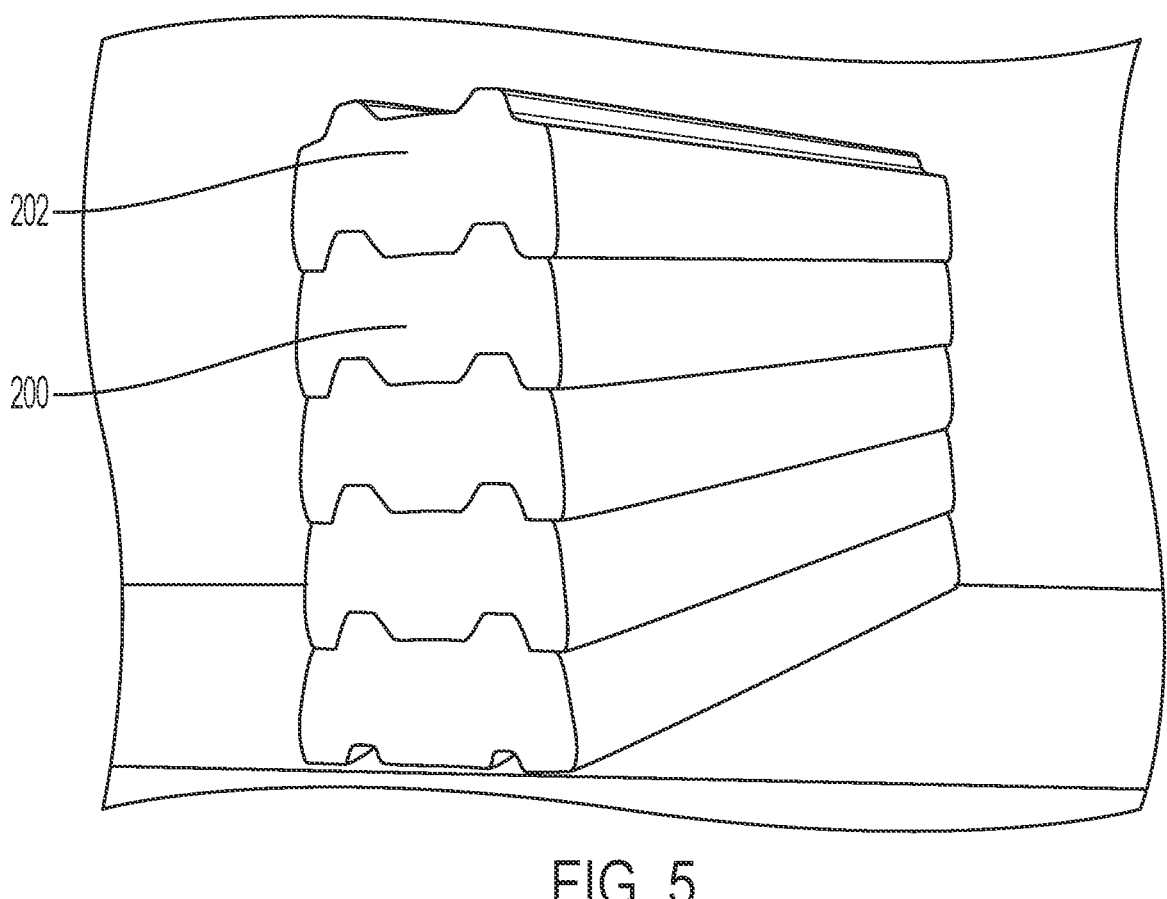
FIG. 5 illustrates a cross-section of mechanically interlocked layers, according to an example embodiment of the present disclosure.

Interlocking of subsequent layers is illustrated, for example, in FIGS. 4 and 5. While FIG. 4 illustrates nozzle 100 printing a first layer 200, and nozzle 150 printing a second layer 202, it should be appreciated that, in alternate embodiments, a single nozzle (e.g., first extruder nozzle 100) is used for printing multiple layers such as first layer 200 and second layer 202. As second layer 202 is printed on top of first layer 200, the raised components on the top-side of first layer 200 (as formed by one of the plurality of ridges 110) interlocks with the recessed components on the bottom-side of the second layer 202.

As should be appreciated herein, a wall is formed by first layer 200, second layer 202, and a number of additional layers. Interlocking between the raised components on the top-side of first layer 200 and the recessed components on the bottom-side of second layer 202 improves the strength of the layers, particularly with respect to lateral loads. The same improvement can be expected by additional layers. Namely, a wall with interlocked layers achieves improved lateral strength.

FIG. 5 illustrates a cross-section of mechanically interlocked layers, according to an example embodiment of the present disclosure. Notably, the layers 200, 202 illustrated in FIG. 5 were intentionally debonded at early age, to show the cross-section of each individual layer. With reference to FIG. 1 and FIG. 5, surface ridges 110A-D are configured ensure that the deposited material interlocks between subsequent layers of deposited material. Via the alignment of surface ridges, deposited layers may engage or interlock with a prior layer through the cross-sectional geometry of the prior deposited layer. In an embodiment, the deposited layer has a generally M-shaped cross-section, which mates with the generally M-shaped cross-section of a prior-deposited layer. While layers 200 and 202 are discussed above, it should be appreciated that the nozzles discussed herein may apply a number of additional layers above or below layers 200 and 202 (as illustrated in FIG. 5), which are consecutively stacked in order to form a wall with improved lateral strength and rigidity.

As used in this specification, including the claims, the term "and/or" is a conjunction that is either inclusive or exclusive. Accordingly, the term "and/or" either signifies the presence of two or more things in a group or signifies that one selection may be made from a group of alternatives.

Without further elaboration, it is believed that one skilled in the art can use the preceding description to utilize the claimed inventions to their fullest extent. The examples and embodiments disclosed herein are to be construed as merely illustrative and not a limitation of the scope of the present disclosure in any way. It will be apparent to those having skill in the art that changes may be made to the details of the above-described embodiments without departing from the underlying principles discussed. In other words, various modifications and improvements of the embodiments specifically disclosed in the description above are within the scope of the appended claims. For example, any suitable combination of features of the various embodiments described is contemplated.

We claim:

1. An extruder nozzle for depositing cementitious material on multiple cementitious materials comprising:
    a proximal end, wherein the proximal end includes a proximal cross-section;
    a distal end, wherein the distal end includes a distal cross-section, wherein the proximal cross-section is different from the distal cross-section, and the distal cross-section includes a plurality of ridges on a top-side and a bottom-side of the distal cross-section;
    wherein 3D printable cementitious material is configured to flow through the extruder nozzle from the proximal end to the distal end, such that the extruder nozzle is a single nozzle including a single distal end configured to deposit a layer of 3D printable cementitious material as an elongated bead contiguously on top of a prior layer of 3D printable cementitious material wherein the nozzle is configured to shape 3D printable cementitious material as the 3D cementitious printable material is advanced from the proximal end to the distal end such that the plurality of ridges are defined at the distal end and non-defined at the proximal end; and
    wherein the extruder nozzle is configured to rotate about an axis orthogonal to a plane defined by the proximal cross section to print multiple layers including a first subset of raised components formed by a subset of ridges on the top-side of the nozzle and including a second subset of recessed components formed by a second subset of ridges on the bottom-side of the nozzle, whereby the raised components of a first layer are configured to interlock with the recessed components of a subsequent layer to form a wall of contiguous cementitious material,
    wherein the single nozzle including the single distal end is configured to extrude the 3D printable cementitious material having a solidly monolithic cross-section excluding non-3D printable cementitious material within an interior or exterior of an extruded contiguous elongated bead along non-segmented portions of the wall,
    wherein the single distal end includes a nozzle opening is disposed in a plane non-parallel to the first layer and the subsequent layer of the contiguous cementitious material.

2. The extruder nozzle of claim 1, wherein the proximal cross-section defines a first plane, wherein the distal cross-section defines a second plane, and wherein the first plane is generally perpendicular to the second plane.

3. The extruder nozzle of claim 1, wherein the proximal cross-section defines a first plane, wherein the distal cross-section defines a second plane, and wherein the first plane is disposed at an angle, relative to the second plane.

4. The extruder nozzle of claim 1, wherein the proximal cross-section is generally circular.

5. The extruder nozzle of claim 1, wherein the distal cross-section is generally rectangular.

6. The extruder nozzle of claim 5, wherein the distal cross-section includes two ridges on the top-side of the distal cross-section and includes two ridges on the bottom-side of the distal cross-section.

7. The extruder nozzle of claim 6, wherein the layer of 3D printable cementitious material, once deposited, has a generally M-shaped cross-section.

8. The extruder nozzle of claim 7, wherein the M-shaped cross-section mates with a cross-section of the prior layer of 3D printable cementitious material.

9. The extruder nozzle of claim 5, wherein the distal cross-section is between 30 and 60 mm in width.

10. The extruder nozzle of claim 5, wherein the distal cross-section is between 15 and 25 mm in height.

\* \* \* \* \*